Sept. 27, 1932.  R. C. McALLISTER  1,879,370
COMPRESSOR CYLINDER
Filed March 3, 1931
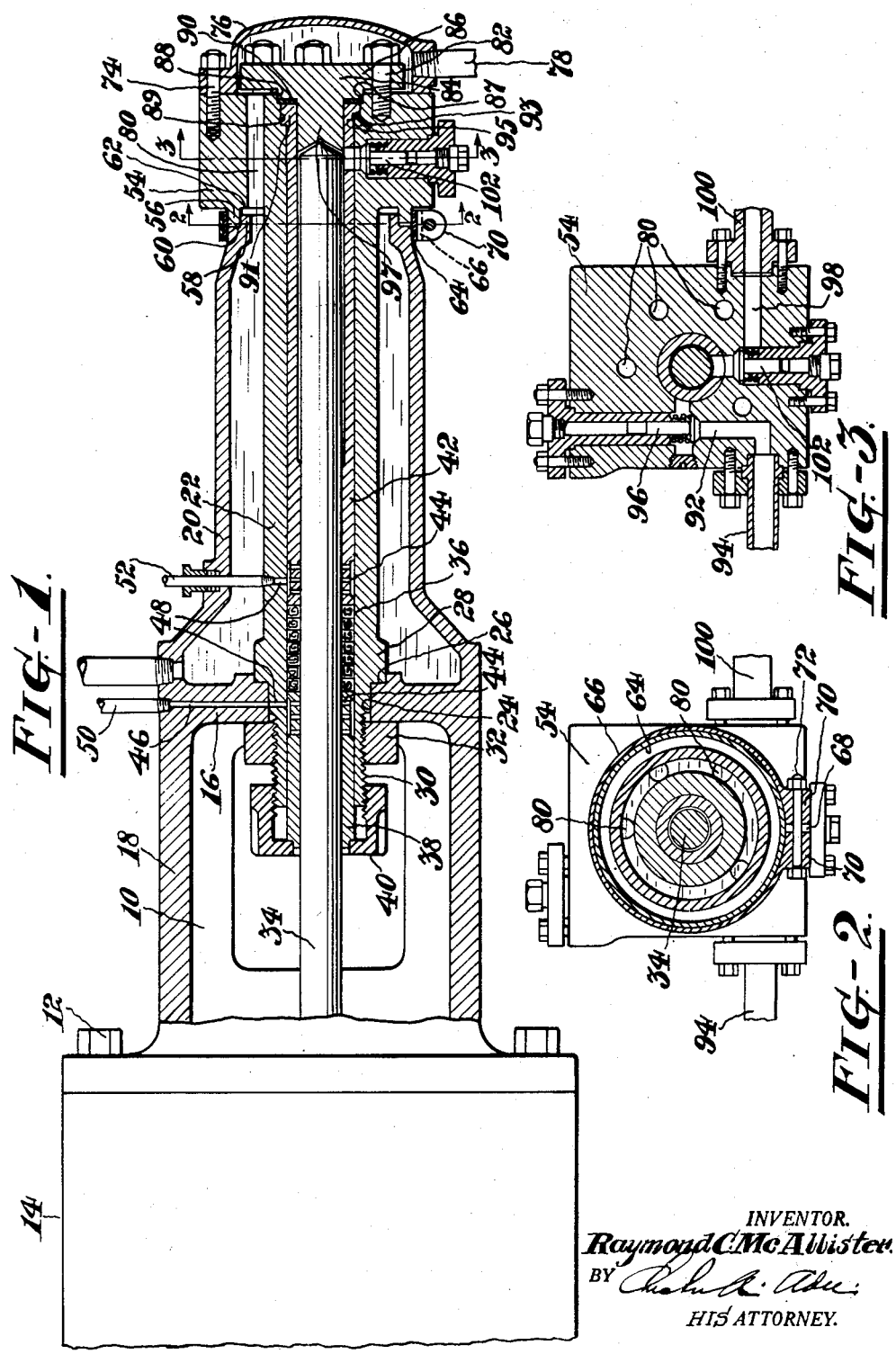

Patented Sept. 27, 1932

1,879,370

UNITED STATES PATENT OFFICE

RAYMOND C. McALLISTER, OF PAINTED POST, NEW YORK, ASSIGNOR TO INGERSOLL-RAND COMPANY, OF JERSEY CITY, NEW JERSEY, A CORPORATION OF NEW JERSEY

COMPRESSOR CYLINDER

Application filed March 3, 1931. Serial No. 519,801.

This invention relates to compressors, but more particularly to a compressor cylinder and the means of mounting the same.

One object of the invention is to permit free expansion and contraction of a compressor cylinder without subjecting neighboring parts to stress.

Another object is to prevent leakage of cooling fluid due to the expanding and contracting movements of the cylinder.

Other objects will be in part obvious and in part pointed out hereinafter.

Referring to the drawing accompanying the specification and in which similar reference numerals designate corresponding parts throughout the several views, Figure 1 is a longitudinal section of as much of a compressor as will suffice to illustrate the invention, Figure 2 is a transverse section taken on the line 2—2 of Figure 1, and Figure 3 is a transverse section taken on the line 3—3 of Figure 1.

Referring more particularly to the drawing, the numeral 10 designates generally a casing for a high pressure cylinder of a compressor and, in this instance, is shown as being secured by means of the bolts 12 to the casing 14 of the lower pressure cylinder. While the invention has been shown and described in connection with the high pressure cylinder of a compressor, it will be understood that this invention is applicable to any cylinder wherein expansion and contraction of the cylinder takes place due to the heat of compression and other causes.

The casing 10 may be of any suitable shape and in this embodiment is provided with an inner transverse wall 16 which divides the casing into a spacing member 18 and a water jacket 20.

The inner wall 16 is adapted to support one end of a high pressure cylinder 22 and, to this end, is provided with a bore 24 in which one end of the cylinder 22 is seated. The wall 16 also has a recess 26 for the reception of a flange 28 formed on the cylinder 22. In order to secure the cylinder firmly in position a portion 30 thereof which projects through the wall 16 may be threaded and a clamping nut 32 is threaded thereon and seats upon the wall 16 to draw the flange 28 against the opposite side of the wall.

Connected to the piston (not shown) of the lower pressure cylinder is the usual plunger 34 which extends longitudinally into the cylinder 22 and is preferably spaced from the inner wall thereof. Suitable packing means may be interposed between the plunger 34 and the cylinder 22 in order to prevent leakage along the plunger. In this instance packing 36 is placed around the plunger and is retained in position by means of the packing gland 38 which abuts one end of the packing and which may be adjusted by the gland nut 40 on the threaded end 30 of the cylinder 22.

Abutting the other end of the packing 36 and extending longitudinally between the cylinder 22 and plunger 34 is a liner 42. The liner 42 and packing gland 38 may be provided with suitable orifices 44 through which lubricant may reach the plunger 34 by way of the passages 46 and 48 in the wall 16 and cylinder 22 respectively. This lubricant may be conveyed to the passages 46 and 48 by suitable connections 50 and 52 leading from a source of supply (not shown).

In accordance with this invention, expansion and contraction of the cylinder 22 may take place without subjecting the neighboring parts, such as the water jacket 20, to stress.

In this embodiment the cylinder 22 is provided with an enlarged head 54 having an annular flange 56 of suitable size to receive an annular flange 58 formed on the free end of the water jacket 20 and which latter flange encircles the cylinder and is spaced therefrom so that, in effect, the head 54 serves as a closure for the water jacket. The flange 56 is preferably a sliding fit on the flange 58 in order that relative movement of the cylinder and casing may take place upon expansion and contraction of the cylinder. The end faces 60 and 62 of the flange 56 are for this purpose preferably normally spaced from the related end faces of the flange 58 on the water jacket 20. To prevent leakage of cooling fluid suitable sealing means may be provided at this point.

In this instance the sealing means comprises a band 64 of suitable resilient material which encircles the flanges and is maintained in position by an outer flexible band 66 preferably of metal. The flexible band 66 may be split as at 68 and has a pair of enlarged portions 70 through which suitable locking means, such as the bolt 72 may extend.

In the end face of the head 54 opposite the flange 56 is secured, as by the bolts 74, a water head 76 to which cooling fluid may be admitted through the inlet pipe 78. Communication between the water head 76 and the water jacket 20 is established by the apertures 80, any suitable number of which may be formed for this purpose in the cylinder head 54.

Positioned within the water head 76, and secured to the cylinder head 54 as by bolts 82, is a closure member 84. A head portion 86 of the closure member 84 extends across the end of the cylinder head 54 but is spaced therefrom by reason of a flanged portion 87 on the closure member 84 being of greater depth than a recess 88 in the cylinder head 54 into which it projects. The flanged portion 87 of the closure member 84 is adapted to retain the liner 42 in position and, to this end, a recess 89 is formed in the cylinder head 54 for the reception of a head 91 on the end of the liner 42.

The liner 42 may be prevented from rotating in the cylinder by means of a pin 93 projecting from the cylinder head 54 into a slot 95 in the liner head 91. Leakage of cooling fluid into the cylinder and leakage of fluid from the cylinder to the water head is prevented by the interposition of a gasket 90 between the flanged portion 87 of the closure member 84 and the bottom of the recess 88 into which the flanged portion 87 projects.

The closure member 84 is also provided with a projecting portion 97 which extends into the end of the liner 42 and forms a closure therefor.

The medium to be compressed may be conveyed to the cylinder head inlet passage 92 by the conduit 94 and the usual inlet valve 96 is provided in the cylinder head 54 to control the admission of such fluid through the passage 92. In a similar manner a discharge passage 98 is provided in the cylinder head 54 leading to the discharge conduit 100 and controlled by the discharge valve 102.

During the operation of the compressor the heat of compression will cause expansion of the cylinder adjacent the cylinder head 54. As described, the novel method of mounting the cylinder with the flange 56 on the cylinder head 54 having its end faces 60 and 62 spaced from the related end faces of the water jacket flange 58 will permit movement of the cylinder head without subjecting the water jacket to stress. Although the end faces of the flanges are spaced one from the other to permit this movement, it will be apparent that leakage of the cooling fluid will not take place due to the sealing means provided by the flexible band encircling the joint.

I claim:

1. In a compressor, a casing having a wall, a cylinder extending longitudinally of the casing and being connected at one end to the wall, and a head on the other end of the cylinder forming a closure for the casing and being in slidable engagement with the casing to seal the casing and to prevent deformation of the casing upon temperature changes in the cylinder.

2. In a compressor, a casing having a wall, a cylinder extending longitudinally of the casing and being connected at one end to the wall, and a head on the other end of the cylinder supported by the casing and lying exteriorly thereof, said head and casing being relatively movable to prevent the transmission of expansive and contractile movement of the cylinder to the casing.

3. In a compressor, a casing having a wall, a cylinder extending longitudinally of the casing and being connected at one end to the wall, and an integral head on the other end of the cylinder extending beyond the end of the casing, said head being in slidable engagement with the casing to prevent deformation of the casing upon expansion and contraction of the cylinder.

4. In a compressor, a casing having a wall, a cylinder extending longitudinally of the casing and being connected at one end to the wall, a head on the other end of the cylinder extending beyond the end of the casing, and cooperating flanges on the head and casing adapted to support said head in slidable engagement with the casing to prevent deformation of the casing upon expansion and contraction of the cylinder.

5. In a compressor, a casing having a wall, an annular flange on the casing, a cylinder extending longitudinally of the casing and being connected at one end to the wall, a head on the other end of the cylinder extending forwardly of said end of the casing, and a rearwardly projecting annular flange on the head cooperating with the flange on the casing, said flanges being adapted to support said head in slidable engagement with the casing to prevent deformation of the casing upon expansion and contraction of the cylinder.

6. In a compressor, a casing having a wall, an annular flange on the casing, a cylinder extending longitudinally of the casing and being connected at one end to the wall, a head on the other end of the cylinder extending forwardly of said end of the casing, and a rearwardly projecting annular flange on the head cooperating with the flange on the casing, said flanges having their related end faces spaced from each other and being adapted to support said head in slidable engagement with the casing to prevent deformation of the casing upon expansion and contraction of the cylinder.

7. In a compressor, a casing having a wall, a cylinder extending longitudinally of the casing and being connected at one end to the wall, a head on the other end of the cylinder forming a closure for the casing and being in slidable engagement with the casing to prevent deformation of the casing upon expansion and contraction of the cylinder, and means cooperating with the casing and head to seal said casing and head.

8. In a compressor, a casing having a wall, a cylinder extending longitudinally of the casing and being connected at one end to the wall, a head on the other end of the cylinder extending beyond the end of the casing, cooperating flanges on the head and casing adapted to support said head in slidable engagement with the casing to prevent deformation of the casing upon expansion and contraction of the cylinder, and a flexible band enclosing the flanges to seal the casing and head.

9. In a compressor, a casing comprising a distance piece and a water jacket separated by an inner transverse wall, an annular flange on the free end of the water jacket, a cylinder extending longitudinally within the water jacket and being connected at one end to the wall, a head on the other end of the cylinder extending forwardly of the free end of the water jacket and having passages therein for liquid to circulate through the head to the water jacket, a closure member for the cylinder secured to the head, a water head enclosing the end of the cylinder head and the closure member, and a rearwardly projecting annular flange on the head cooperating with the flange on the water jacket, said flanges being adapted to support said head in slidable engagement with the casing to prevent deformation of the water jacket upon expansion and contraction of the cylinder.

10. In a compressor, a casing comprising a distance piece and a water jacket separated by an inner transverse wall, an annular flange on the free end of the water jacket, a cylinder extending longitudinally within the water jacket and being connected at one end to the wall, a plunger reciprocable in the cylinder and spaced from the walls thereof, packing between the plunger and the cylinder, means on the end of the cylinder adjacent the wall and abutting one end of the packing to retain said packing in position, a liner for the cylinder abutting the other end of the packing, a head on the other end of the cylinder extending forwardly of the free end of the water jacket and having passages therein for liquid to circulate through the head to the water jacket, a closure member for the cylinder secured to the head, a water head enclosing the end of the cylinder head and the closure member, and a rearwardly projecting annular flange on the head cooperating with the flange on the water jacket, said flanges being adapted to support said head in slidable engagement with the casing to prevent deformation of the water jacket upon expansion and contraction of the cylinder.

In testimony whereof I have signed this specification.

RAYMOND C. McALLISTER.